United States Patent [19]
Lee et al.

[11] Patent Number: 5,548,906
[45] Date of Patent: Aug. 27, 1996

[54] VAPORIZING AND CONCENTRATION DRYING APPARATUS AND METHOD

[76] Inventors: Dae Sung Lee, B-307, Yangji Apt. #275, Nonhyun-Dong, Kangnam-Ku, Seoul; Ho Keun Shin, 40 Manri-Dong 2-ga, Chung-Ku, Seoul, both of Rep. of Korea

[21] Appl. No.: 344,984

[22] Filed: Nov. 25, 1994

[30] Foreign Application Priority Data

Oct. 17, 1994 [KR] Rep. of Korea .................. 26474/94

[51] Int. Cl.$^6$ ................................................. F26B 3/00
[52] U.S. Cl. ................... 34/338; 34/381; 34/386; 34/424; 34/469; 34/470; 34/515; 34/77; 34/79
[58] Field of Search ................. 34/338, 349, 356, 34/381, 386, 418, 424, 469, 470, 514, 515, 60, 77, 79

[56] References Cited

U.S. PATENT DOCUMENTS

| | | | |
|---|---|---|---|
| 3,112,188 | 11/1963 | Zehnder | 34/77 |
| 4,097,378 | 6/1978 | St. Clair | 34/349 |
| 4,581,829 | 4/1986 | Becker et al. | 34/514 |
| 4,974,335 | 12/1990 | Bege et al. | 34/424 |

*Primary Examiner*—Daniel F. Lopez
*Attorney, Agent, or Firm*—Vidas, Arrett & Steinkraus, P.A.

[57] ABSTRACT

Vaporizing and concentration drying apparatus and method are disclosed. The apparatus and method prepare good quality of condensed water and save evaporation energy and are wide used in making contaminated waste water become distilled water and in purification of the waste water and in concentration and drying of varieties of environmental polluting sludge. The apparatus and method recover and reuse the heating energy, which energy was applied to the vapor so as to heat the vapor to a high temperature and to remove the environmental polluting impurities, such as odor, B.O.D. and C.O.D. laden in the vapor, so that the apparatus and method remarkably save the cost for the heating energy. The apparatus saves the energy by 2–10 times in comparison with the conventional apparatus.

3 Claims, 3 Drawing Sheets

VAPORIZING AND CONCENTRATION DRYING APPARATUS AND METHOD

BACKGROUND OF THE INVENTION

1. Field of the Invention

The present invention relates in general to vaporizing and concentration drying apparatus and method and, more particularly, to an improvement in such apparatus and method for recovering and reusing evaporation heat by means of liquidizing at a high temperature, that is, latent heat occurred in the process of vaporization reducing or increasing the pressure so as to save heating energy, and for oxidizing or carbonizing the vaporized impurities, such as odor, B.O.D. and C.O.D. laden in the vapor, at a high temperature so as to remove the vaporized impurities and to provide good quality of condensed water.

2. Description of the Prior Art

In conventional vaporizing apparatus, cooling water for condensing of vapor should be added to the apparatus along with the required heat for vaporization, that is, boiling heat (100 Kcal) and evaporation heat (latent heat of vaporization, 539 Kcal/l). In the case of distilled water which is prepared by vaporization and condensation of wet material, such as wet sludge or waste water, using the above vaporizing apparatus, a part of environmental polluting impurities, such as odor, B.O.D. and C.O.D., laden in the wet material is vaporized along with the vapor, thus to be laden in the vapor. The impurities laden in the vapor in turn are liquidized along with the vapor when condensing the vapor. The distilled water thus can not achieve allowable standard quality of water, so that the distilled water needs to be retreated in order to achieve the allowable standard quality.

The typical vaporizing apparatus as well as the typical vaporizing method can not recover and reuse the latent heat of vaporization (539 Kcal/l) of the vapor, but discard the latent heat through a condenser system used in cooling and condensing the vapor laden with impurities. Furthermore, such discarding of the latent heat should be accompanied by considerable cost.

Additionally, the typical vaporizing apparatus or the typical vaporizing method can not remove the impurities, such as odor, B.O.D. and C.O.D., which impurities are vaporized and liquidized along with the vapor and reduce the quality of the distilled water. In this regard, the distilled water should be treated through an additional water purifying procedure so as to improve the quality of the distilled water. The additional water purifying procedure for improving the quality of the distilled water is very complicated and increases the cost for preparation of the distilled water.

When water is vaporized using a pressure reducing vaporizing method so as to become steam, the evaporation heat can be saved by the amount of reduced pressure according to degree of vacuum. However, this pressure reducing vaporizing method still has a problem that the condensed water is laden with odor, B.O.D. and C.O.D., so that the condensed water needs to be treated through additional procedure for deodorization and for water purification.

In the typical heating vaporizing apparatus, the total heat for vaporizing 1 l of water of 0° C. at atmospheric pressure is 639 Kcal. That is, the boiling heat for boiling the water at 100° C. is 100 Kcal and the evaporation heat for vaporizing the boiled water is 539 Kcal, so that the total heat for vaporizing 1 l of water is 639 Kcal, that is, 100 Kcal+539 Kcal=639 Kcal. When vaporizing 1 l of water of 0° C. using pressure reducing vaporizer, the water is boiled at 35° C. under the condition that the degree of vacuum is about 10 Torr (750 mmHg), so that the total heat for vaporizing 1 l of water is 605 Kcal, that is, 35 Kcal+570 Kcal=605 Kcal (latent heat may be about 570 Kcal when vaporizing pressure is 0.1 kg/cm$^2$.A).

However, the typical vaporizing apparatus should use a condenser for condensing and liquidizing the vapor, so that large amount of cooling water for condensing should be added to the apparatus. Furthermore, the latent heat (539 Kcal) of the vapor can not be recovered and reused, but discarded.

Briefly described, when vaporizing 1 l of water of 0° C. at atmospheric pressure using either the typical pressure reducing vaporizing method or the typical heating vaporizing method, the total heat to be applied to the water is 574 Kcal or 639 Kcal. Furthermore, additional energy for supplying the cooling water of the condenser should be applied to the apparatus. In the process of condensing the vapor, the latent heat (539 Kcal) of vaporization can not be recovered but discarded. In addition, the typical vaporizing apparatus itself can not remove the environmental polluting impurities, such as odor, B.O.D. and C.O.D., from the condensed water, so that the condensed water needs to be treated through additional procedure for deodorization and for water purification.

SUMMARY OF THE INVENTION

It is, therefore, an object of the present invention to provide vaporizing and concentration drying apparatus and method in which the above problems can be overcome and which provides good quality of condensed water and saves evaporation energy so as to save the heating energy by reusing latent heat occurred in the process of vaporization reducing or increasing the pressure, and is wide used in making contaminated waste water become distilled water and in purification of the waste water and in concentration drying of varieties of environmental polluting sludge.

The apparatus and method of the invention recover and reuse heating energy, which energy was applied to the vapor so as to heat the vapor to a high temperature for oxidizing or carbonizing and to remove the environmental polluting impurities, such as odor, B.O.D. and C.O.D. laden in the vapor, so that the apparatus and method remarkably save the cost for the heating energy.

The present invention reduces the cost for production of the vaporizing apparatus and for operation of the apparatus in comparison with the conventional apparatus, thus to provide economic advantage for the user. The apparatus also saves the energy by 2–10 times in comparison with the conventional apparatus. In the apparatus of this invention, the odor and the impurities laden in the vapor can be oxidized or carbonized and be completely removed from the vapor when heating the vapor at a high temperature, so that the apparatus provides good quality of distilled water without using additional water purifying means.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
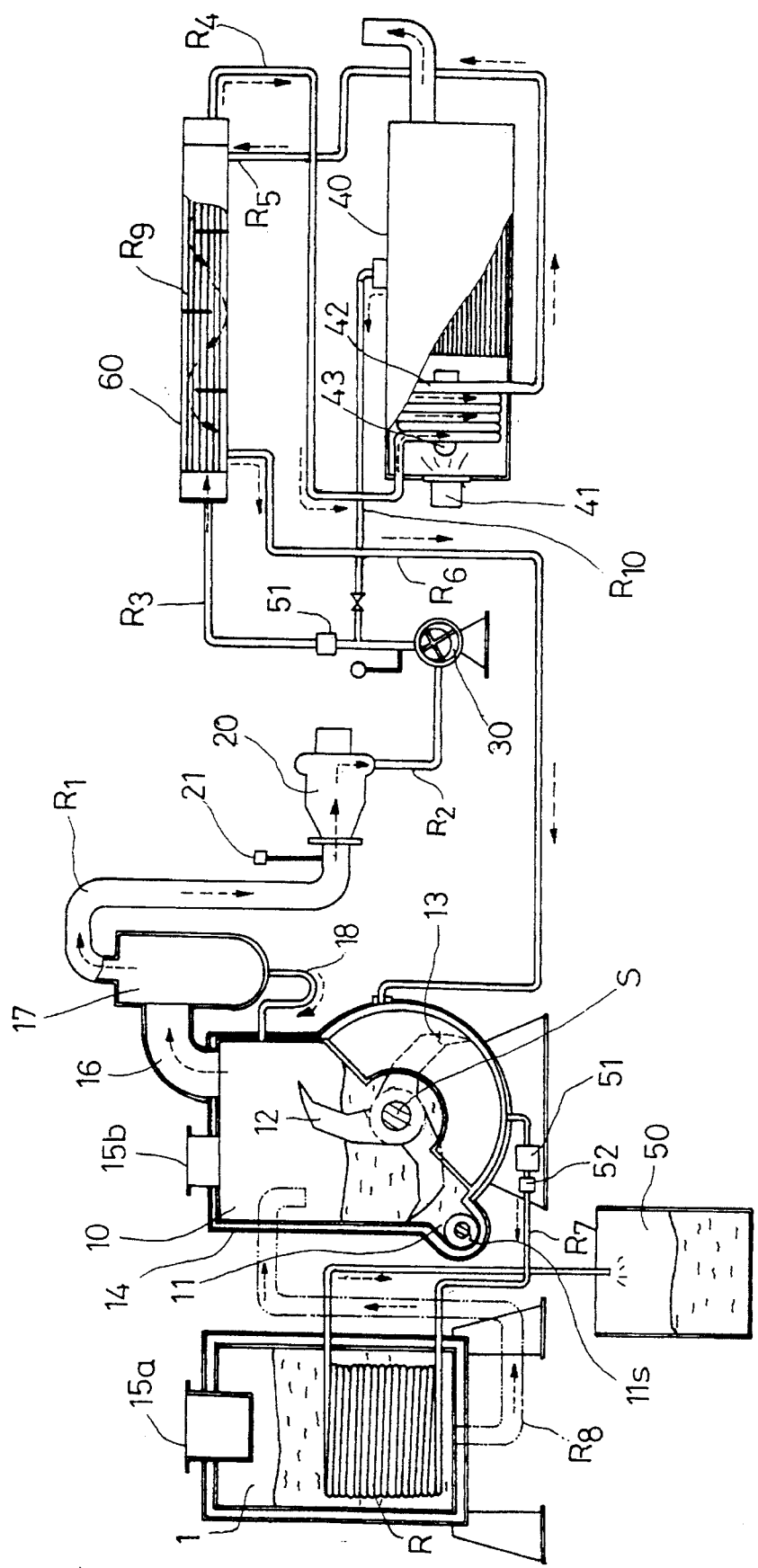
FIG. 1 is a partially sectioned view of vaporizing and concentration drying apparatus according to a preferred embodiment of the present invention.
Figure 4:
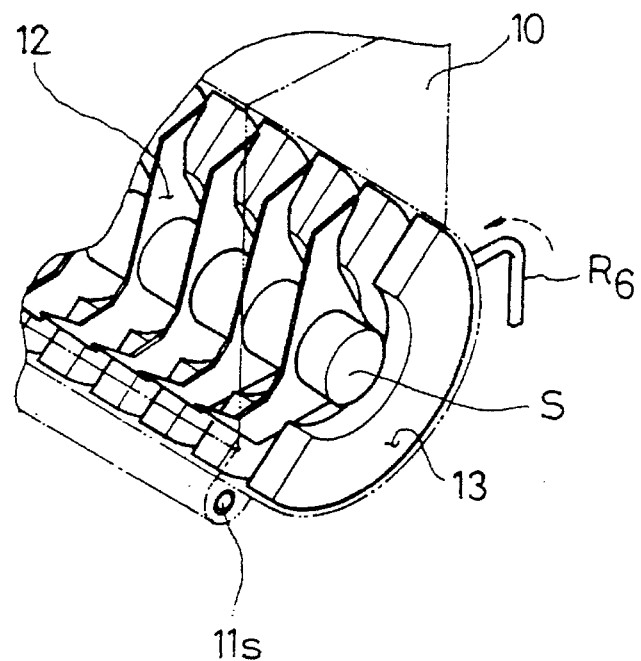
FIG. 4 is a partial perspective view of agitating blades and panel type steam chambers, which blades and chambers are installed in a vaporizer of the apparatus of FIG. 1.
Figure 5:
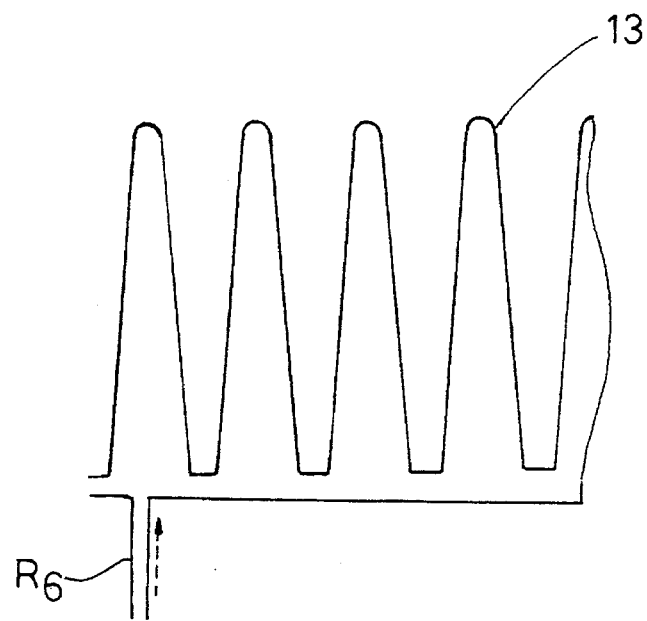
FIG. 5 is a partially enlarged view showing the panel type steam chambers of FIG. 4.

With reference to FIG. 1, there is shown, in a partially sectioned view, a construction of vaporizing and concentration drying apparatus according to a preferred embodiment of the invention. In this drawing, the reference numeral 1 denotes a container for containing the wet material to be treated by vaporizing. The container 1, which is equipped with a coiled tube R therein, is provided on its top with a first inlet port 15a for charging the wet material, for example, the water or the wet sludge, to be treated. The container 1 is cased by a double structure wall, which double structure wall is for recovering waste heat from condensed water which will circulate in the container 1. The container 1 is connected to a vaporizer 10 for vaporizing and concentration drying the wet material, which vaporizer 10 is an agitating type vaporizer and will contain therein wet material, for example, waste water or wet sludge. The vaporizer 10 is provided on its top with a second inlet port 15b for selectively charging the wet material to be vaporized. The vaporizer 10 is rounded on its bottom and has a recess 11 in a lower section of the side wall beside the rounded bottom. A screw 11s for discharging sludge to the outside of the vaporizer 10 is placed in the recess 11. In order to agitate the wet material in the vaporizer 10, a plurality of panel type semicircular steam chambers 13 are vertically placed in the vaporizer 10, so that the chambers 13 are horizontally arranged and regularly spaced apart from each other as shown in FIGS. 4 and 5. A plurality of agitating blades 12 are placed between the chambers 13. Each of blades 12 can be rotated in opposed directions in the space defined between the chambers 13, thus to agitate the wet material to be vaporized. As shown in FIG. 5, the inside end sections of the opposed side walls of each of the panel type steam chambers 13 smoothly converge into a single ridge, thus to let smooth rotation of the agitating blades 12 placed between the panel type steam chambers 13. The agitating blades 12 are fitted over a blade shaft S, which shaft S lengthwise extends in the center of the vaporizer 10. The panel type steam chambers 13 communicate with a steam chamber 14 defined in the double structure wall of the vaporizer 10. The top of the vaporizer 10 is connected to an overflow preventing chamber 17 through a connection pipe 16, which overflow preventing chamber 17 in turn is connected to the interior of the vaporizer 10 through a U-shaped trap 18. The trap 18 extends from the bottom of the chamber 17 to the interior of the vaporizer 10.

Figure 2:
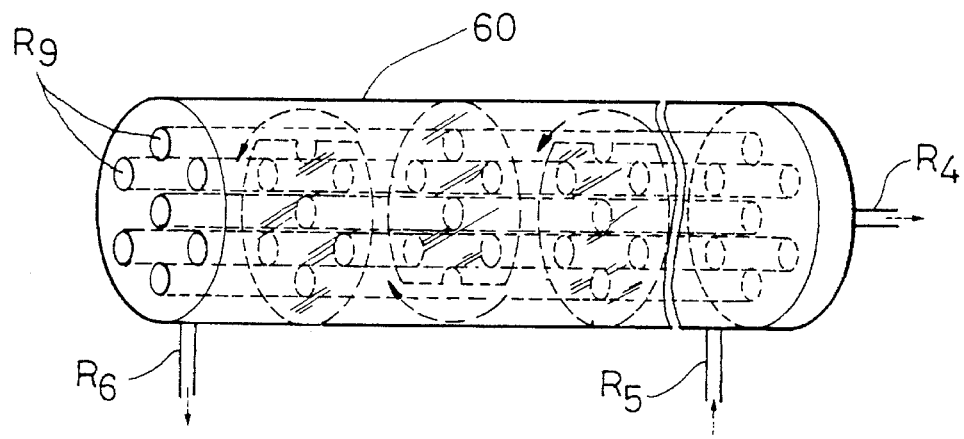
FIG. 2 is a perspective view of a heat recovering unit of the apparatus of FIG. 1, showing the internal structure of the unit.
Figure 3:
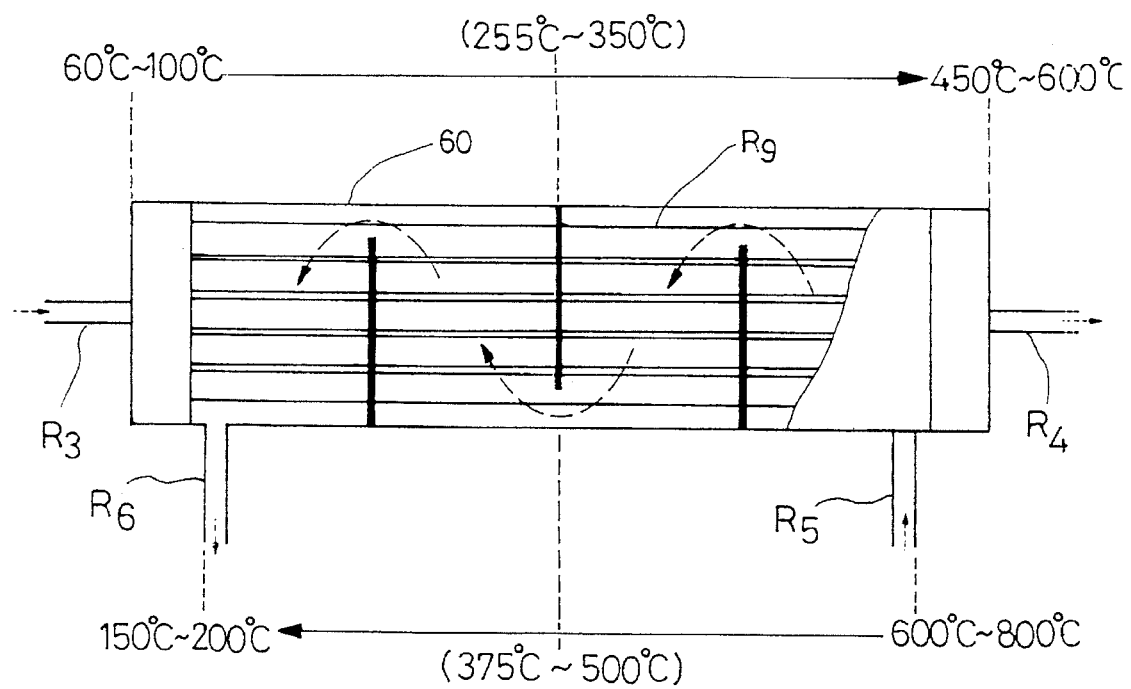
FIG. 3 is a partially sectioned front view of the heat recovering unit of FIG. 2, showing the heat exchanging state between reversely flowing high temperature vapor and normally flowing lower temperature vapor in the unit.

A first conduit $R_1$ extends from the top of the overflow preventing chamber 17 to a vapor compressing turbine 20. The conduit $R_1$ is provided with a control valve 21 for supplying of preheated air to the vapor flowing in the conduit $R_1$. The rear end of the vapor compressing turbine 20 in turn is connected to a vapor compressing pump 30 through a second conduit $R_2$. A third conduit $R_3$ extends from the vapor compressing pump 30 to a heat recovering unit 60. As shown in FIGS. 1 to 3, the heat recovering unit 60, which is adapted for recovering the heat from a high temperature vapor and reusing the recovered heat for preheating low temperature vapor, is equipped with a bundle of ninth conduits or steam conduits $R_9$, which conduits $R_9$ horizontally extend in the unit 60 and regularly spaced out. The opposed ends of the heat recovering unit 60 in turn are connected to an auxiliary boiler 40, having its own heating means, and to the vaporizer 10 through the fourth and sixth conduits $R_4$ and $R_6$ respectively. In the auxiliary boiler 40, the fourth conduit $R_4$ is connected to a coiled vapor heating tube 42 in front of the nozzle of a burner 41. The burner 41 is mounted to the front wall of the boiler 40 and generates flame which will be directed to the interior of the boiler 40. The coiled tube 42, which surrounds a vapor heating chamber 43 in the boiler 40, in turn is connected to the heat recovering unit 60 through a fifth conduit $R_5$. Thus, the latent heat of vapor can be recovered by the unit 60 and reused for preheating the low temperature vapor flowing in the steam conduits $R_9$.

A seventh conduit $R_7$, having a pressure regulator 51 as well as a drain valve 52, extends from the steam chamber 14 of the vaporizer 10 at the rounded bottom of the vaporizer 10 and connected to the container 1. In the container 1, the condensed water loses the heat while passing through the coiled tube R. The condensed water is, thereafter, introduced into a condensed water tank 50, thus to be collected in the tank 50.

In operation of the above apparatus, the wet material to be vaporized, for example, waste water is charged in the container 1 through the first inlet port 15a of the container 1, which container 1 can recover the waste heat from the condensed water. The waste water in turn is introduced into the vaporizer 10 through an eighth conduit $R_8$, thus to be vaporized or concentration dried in the vaporizer 10 and to become vapor. The vapor in turn flows to the overflow preventing chamber 17 through the connection pipe 16 and, thereafter, is introduced into the turbine 20 through the first conduit $R_1$. Prior to introduction of the vapor to the turbine 20, the control valve 21 of the first conduit $R_1$ adds an appropriate amount of preheated air to the vapor. Here, the preheated air added to the vapor in accordance with characteristics of vaporized impurities laden in the vapor is for promotion of oxidation of the impurities. However, it should be understood that the vapor laden with the impurities may be carbonized at a high temperature without addition of preheated air in accordance with characteristics of the vaporization subject. At this time, the vaporizer 10 is vacuumized due to action of the vapor compressing turbine 20 and due to action of the vapor compressing pump 30, so that the vaporizer 10 has an inner temperature of about 60° C. as well as a degree of vacuum ranged from about 300 mmHg to about 400 mmHg. The vapor is, thereafter, more compressed by the vapor compressing pump 30, so that the vapor pressure is increased.

The high pressure vapor in turn is introduced into the steam conduits $R_9$ of the heat recovering unit 60 through the third conduit $R_3$ and discharged from the unit 60 to the auxiliary boiler 40 through the fourth conduit $R_4$. In the auxiliary boiler 40, the vapor is heated by vapor heating means while passing through the vapor heating tube 42 and through the vapor heating chamber 43, thus to become high temperature vapor, the temperature of which vapor is ranged from about 600° C. to 800° C. As a result of heating of the vapor in the boiler 40, the impurities laden in the vapor, such as odor, B.O.D. and C.O.D., are removed from the vapor by oxidation and carbonization. The vapor, after being heated by the boiler 40, returns to the heat recovering unit 60 through the fifth conduit $R_5$. In the unit 60, the vapor of 600° C. to 800° C. exchanges the heat with new vapor, which new vapor is newly introduced into the conduits $R_9$ of the unit 60 and has a low temperature ranged from 60° C. to 100° C. In the heat recovering unit 60, the vapor which was heated by the vapor heating means of the boiler 40 is guided by guiding partitions of the unit 60 to about the steam conduit $R_9$, through which conduit $R_9$ the low temperature vapor passes. That is, the high temperature vapor in the unit 60 flows from the rear section to the front section of the unit 60 in a zigzag passage and exchanges the heat with the low temperature vapor passing through the conduit $R_9$ from the front section to the rear section.

As shown in FIG. 2, the guide partitions may be vertically placed in the heat recovering unit 60, so that the partitions are spaced out at regular intervals. The partitions will lengthen the heat exchanging time of the vapor in the unit 60, thus to improve the heat exchanging effect of the unit 60. However in the first stage of the operation of the apparatus, the water in the boiler 40 is heated by the heating means of the boiler 40, thus to become high temperature steam. The carbonized or oxidized high temperature steam of the boiler 40 is supplied to the panel type steam chambers 13 and to the steam chamber 14 of the vaporizer 10 through a tenth conduit $R_{10}$, the third conduit $R_3$ with the regulator 51, the heat recovering unit 60, the fourth conduit $R_4$, the boiler 40, the fifth conduit $R_5$, the unit 60 and the sixth conduit $R_6$ in turn. In the vaporizer 10, the high temperature steam supplied from the boiler 40 exchanges the heat with the waste water, thus to make the waste water become low temperature vapor of about 60° C.–100° C. The vapor of about 60° C.–100° C. is introduced into the heat recovering unit 60 through the above-described procedure and absorbs the heat from the high temperature vapor supplied from the boiler 40 through the fifth conduit $R_5$. As a result of the heat exchanging, the temperature of the lower temperature vapor is increased from 60° C.–100° C. to 450° C.–600° C. The preheated vapor of 450° C.–600° C. in turn is discharged from the unit 60 to the boiler 40 through the fourth conduit $R_4$. Meanwhile, the vapor whose temperature was reduced to 150° C.–200° C. as a result of heat exchanging in the heat recovering unit 60 is discharged to the vaporizer 10 through the sixth conduit $R_6$.

The preheated vapor of 450° C.–600° C. discharged from the unit 60 to the boiler 40 through the fourth conduit $R_4$ is heated in the boiler 40 by the vapor heating means of the boiler 40 and introduced into the coiled vapor heating tube 42 and into the vapor heating chamber 43, thus to be oxidized or carbonized and to become vapor of high temperature of 600° C.–800° C. The oxidized or carbonized vapor of the boiler 40 is introduced into the unit 60 through the fifth conduit $R_5$ and flows from the rear section to the front section of the unit 60 in the zigzag passage and exchanges the heat with the vapor of low temperature of 60° C.–100° C. passing through the conduit $R_9$ from the front section to the rear section. Here, the heating energy, which energy was applied to the vapor in the boiler 40 by the vapor heating means and heats the vapor and increases the temperature of the vapor to 600° C.–800° C., is recovered in the heat recovering unit 60. That is, the heating energy laden in the high temperature vapor of 600° C.–800° C. is recovered and reused for preheating the vapor flowing in the steam conduits $R_9$ of the unit 60 as represented in FIG. 3. As a result of the preheating, the temperature of the vapor introduced from the vaporizer 10 is increased from 60° C.–80° C. to 450° C.–600° C. As the temperature of the vapor, which vapor will be introduced into the boiler 40, is increased from 60° C.–80° C. to 450° C.–600° C. as a result of heat exchanging in the unit 60, the heating energy of the heating means of the boiler 40 can be remarkably saved.

The vapor, which vapor is discharged from the unit 60 through the sixth conduit $R_6$ and has the temperature of 150° C.–200° C. and whose impurities was oxidized or carbonized, is supplied to the panel type steam chambers 13 and to the steam chamber 14 of the vaporizer 10. In the vaporizer 10, the vapor supplied from the unit 60 exchanges the heat with the waste water, thus to lose its evaporation heat and to be liquidized and to become relatively high temperature condensed water, so that the water or the wet material of the vaporizer 10 recovers 539 Kcal (when vaporizing pressure is 1.013 $kg/cm^2$.A) of latent heat from the vapor by means of liquidizing at a high temperature. This condensed water of about 80° C.–120° C. in turn is introduced into the coiled tube R of the container 1 through the seventh conduit R7 having both the pressure regulator 51 and the drain valve 52. The coiled tube R secondarily recovers the waste heat from the condensed water. The condensed water is collected to the condensed water tank 50. When filtering the condensed water in the tank 50, the oxidized or carbonized impurities are removed from the condensed water, thus to let the condensed water become good distilled water.

In the above embodiment, the waste water is vaporized through pressure reducing vaporization. However, it should be understood that the waste water may be vaporized at a high pressure not less than the atmospheric pressure. That is, the apparatus of the present invention may vaporize the waste water under the pressurized condition.

The operational effect of the invention will be described hereinbelow.

The wet material to be vaporized or the waste water in the container 1 absorbs the waste heat from the high temperature condensed water flowing in the coiled tube R. The preheated waste water is, thereafter, naturally introduced into the vaporizer 10 through the eighth conduit $R_8$ due to the pressure reducing action of the vapor compressing turbine 20 as well as due to the pressure reducing action of the vapor compressing pump 30. In the vaporizer 10, the agitating blades 12 even mixes the waste water, so that the waste water will be vaporized as will be described hereinbelow. After mixing the preheated waste water, the sludge of the waste water is collected to the recess 11 of the vaporizer 10. The sludge in the recess 11 in turn is discharged to the outside of the vaporizer 10 by the sludge discharging screw 11*s*. Meanwhile, the remaining waste water free from the sludge absorbs the evaporation heat from the high temperature vapor of 150° C.–200° C. flowing in the panel type steam chambers 13 and flowing in the steam chamber 14 of the vaporizer 10, thus to be vaporized and become low temperature vapor. The waste water in the vapor state in turn is introduced from the vaporizer 10 into the overflow preventing chamber 17 through the connection pipe 16, which overflow preventing chamber 17 has the U-shaped trap 18 extending from the bottom of the chamber 17 to the interior of the vaporizer 10 and adapted for preventing possible overflow of the waste water out of the vaporizer 10 during vaporization in the vaporizer 10. The vapor of the waste water is, thereafter, introduced into the vapor compressing turbine 20 through the first conduit $R_1$ which extends from the top of the chamber 17 to the vapor compressing turbine 20. Before introduction of the vapor to the turbine 20, the vapor may be selectively added with the predetermined amount of preheated air under the control of the control valve 21, which valve 21 is placed in front of the vapor inlet port of the turbine 20.

The vapor of the vapor compressing turbine 20 in turn is introduced into the vapor compressing pump 30 wherein the vapor is compressed so as to increase its pressure. At this time, the waste water in the vaporizer 10 is vaporized at a temperature of about 60° C. due to the pressure reducing condition in the vaporizer 10. In addition, the vaporizer 10 achieves the degree of vacuum ranged from about 300 mmHg to about 400 mmHg due to the pressure reducing action of the vapor compressing turbine 20 as well as due to the pressure reducing action of the vapor compressing pump 30. As will be represented by the following basic equation (E-1) concerning to the ideal gas, the pressure of the vapor may be increased by both the turbine 20 and the pump 30, so that the vapor is liquidized at a high pressure and at a high temperature. Of course, the apparatus of the invention may use a vacuum booster, a vacuum molecular pump or a vapor compressing member other than the vapor compressing turbine 20 of the above primary embodiment.

$$PV = n_t RT \quad (E\text{-}1)$$

wherein

P: pressure of vapor;

V: volume of the vapor;

T: absolute temperature of the vapor;

R: gas constant; and $n_t$: summed mole of gases included in the vapor of volume V.

The vapor in turn passes through the steam conduits $R_9$ of the heat recovering unit 60 under the condition that the vapor pressure was more increased by both the turbine 20 and the pump 30. While passing through the steam conduits $R_9$, the vapor absorbs the heat from the high temperature vapor reversely flowing about the conduits $R_9$ in the unit 60. The vapor laden with impurities, after being preheated in the conduits $R_9$, is introduced into the vapor heating chamber 43 of the boiler 40 and heated to a temperature of 600° C.–800° C. by the heating means of the boiler 40, thus to be oxidized or carbonized. The oxidized or carbonized high temperature vapor returns to the heat recovering unit 60 and reversely flows in the zigzag passage about the steam conduits $R_9$ in the unit 60. At this time, the new vapor, which vapor is newly introduced into the unit 60 and has the relatively low temperature of 60° C.–100° C., flows in the steam conduit $R_9$ of the unit 60. In the unit 60, the vapor which was heated by the vapor heating means of the boiler 40 is guided by the vertically placed guiding partitions of the unit 60 to about the steam conduit $R_9$, thus to exchange the heat with the new vapor as shown in FIGS. 2 and 3.

The vapor, which was preheated to the temperature of 450° C.–600° C., is introduced into the vapor heating tube 42 and into the vapor heating chamber 43 through the fourth conduit $R_4$, thus to become the oxidized or carbonized vapor of high temperature of 600° C.–800° C. Meanwhile, the vapor, which vapor lost the heating energy and whose temperature was reduced to 150° C.–200° C., is introduced into the panel type steam chambers 13 and into the steam chamber 14 of the vaporizer 10 through the sixth conduit $R_6$. While passing through the panel type steam chambers 13 and through the steam chamber 14 of the vaporizer 10, the vapor of 150° C.–200° C. exchanges the heat with the waste water, thus to be liquidized and to become the condensed water of about 80° C.–120° C. This is because the high pressure vapor is liquidized at a high temperature proportional to its vapor pressure due to the fact that the vapor will be liquidized at a temperature proportional to the vapor pressure as represented by the above equation E-1.

The condensed water of about 80° C.–120° C. in turn is introduced into the coiled tube R of the container 1 through the seventh conduit R7 having both the pressure regulator 51 and the drain valve 52. The coiled tube R secondarily recovers the waste heat from the condensed water and gives the waste heat to the waste water of the container 1. The condensed water, after losing the waste heat, is collected to the condensed water tank 50. On the other hand, the vapor of the temperature 60° C.–100° C., which vapor was prepared by vaporizing the waste water using the latent heat recovered by the vaporizer 10, is introduced into the heat recovering unit 60 through the overflow preventing chamber 17.

The impurities in the vapor, such as odor, B.O.D. and C.O.D. which were vaporized along with the vapor and laden in the vapor, are mixed with the predetermined amount of preheated air supplied by the control valve 21, which valve 21 is placed in front of the vapor inlet port of the turbine 20. As a result of mixing with the preheated air, the impurities of the vapor become oxidizable impurities. The oxidizable impurities are introduced into the vapor heating means of the boiler 40, that is, the vapor heating tube 42 and the vapor heating chamber 43. Therefore, the impurities are oxidized and burnt under the high temperature atmosphere of 600° C.–800° C. in the boiler 40, thus to be removed from the vapor. Alternatively, the vapor laden with the impurities may be carbonized under the high temperature atmosphere of 600° C.–800° C. without addition of preheated air in accordance with characteristics of the vapor, thus to remove the impurities such as odor, B.O.D. and C.O.D. from the vapor. The vapor heating energy, which energy was applied to the vapor by the vapor heating means of the boiler 40 so as to generate the high temperature atmosphere, is recovered by the unit 60 and reused in preheating the low temperature vapor in the unit 60. In this regard, the apparatus of this invention saves the vapor heating energy by the amount of recovered energy used in preheating the vapor in the unit 60.

It should be understood that the apparatus of this invention may improve its energy efficiency by thermally insulating the container 1, the vaporizer 10, the auxiliary boiler 40 and etc..

In order to measure the operational effect of the apparatus and of the method of this invention, an example was carried out as follows. That is, excretions as the wet material to be vaporized was heated, oxidized and burnt at 620° C. or heated and carbonized at 620° C. The results are shown in the following Table (T-1). As shown in the Table (T-1), the wet material treated using the apparatus of the invention and in accordance with the method of the invention can be most effectively purified.

TABLE (T-1)

| Contents | Standard | Results (A) | Results (B) |
|---|---|---|---|
| pH | 5.8–8.6 | 9.0 | 9.8 |
| COD | 150 (mg/l) | 6.4 (mg/l) | 6.6 (mg/l) |
| BOD | 150 (mg/l) | 5.6 (mg/l) | 5.9 (mg/l) |
| SS | 150 (mg/l) | 4.0 (mg/l) | 4.5 (mg/l) |
| N-Hexane | 30 (mg/l) | 0.8 (mg/l) | 4.0 (mg/l) |
| T—N | 60 (mg/l) | 16.1 (mg/l) | 16.5 (mg/l) |

TABLE (T-1)-continued

| | | Results | |
|---|---|---|---|
| Contents | Standard | (A) | (B) |
| T—P | 8 (mg/l) | 0.033 (mg/l) | 0.034 (mg/l) |
| NH$_3$—N | — | 5.358 (mg/l) | 4.632 (mg/l) |

As described above, the present invention reduces the cost for production of the vaporizing and concentration drying apparatus and for operation of the apparatus in comparison with the conventional vaporizing apparatus, thus to provide economic advantage for the user. The apparatus also keeps its improved performance, so that the apparatus can prepare good distilled water with low cost and is wide used for vaporization and concentration drying of poisonous waste water and of environmental polluting waste water, and for vaporization, concentration and drying of waste sludge. Furthermore, the heat recovering unit of the apparatus of the invention recovers vapor heating energy, which energy was applied to the vapor by heating means of a boiler for heating the vapor to a high temperature and for removing the impurities laden in the vapor, such as odor, B.O.D. and C.O.D.. The recovered energy is reused in preheating the vapor which is newly introduced into the heat recovering unit. In this regard, the apparatus of the invention saves the heating energy by the amount of recovered energy used in preheating the vapor in the heat recovering unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. Vaporizing and concentration drying apparatus, wherein the improvement comprises:

a container for containing wet material therein, said container having a double structure wall and equipped with a coiled tube therein, and provided on its top with a first inlet port for charging the wet material in the container, said coiled tube being connected to a condensed water tank;

an agitating type vaporizer for recovering latent heat of vapor and vaporizing the wet material using recovered latent heat, said vaporizer being connected to a bottom of said container through a conduit for receiving the wet material from the container, and said vaporizer including:

a second inlet port provided on a top of the vaporizer;

a rounded bottom;

a recess provided in a side wall near the rounded bottom and equipped with a screw for discharging sludge to an outside of the vaporizer;

a plurality of panel type semicircular steam chambers communicating with each other, each of said panel type steam chambers being vertically placed in an interior of the vaporizer, so that the panel type chambers are horizontally arranged and regularly spaced out, and said panel type chambers being connected to said coiled tube of the container through a conduit having both a pressure regulator and a drain valve;

a plurality of agitating blades for agitating the wet material in the vaporizer, said blades being placed between said panel type chambers and each blade being rotated in opposed directions so as to evenly agitate the wet material;

a blade shaft lengthwise extending in the center of said vaporizer and supporting the agitating blades thereon; and an overflow preventing chamber for preventing overflow of liquid out of said vaporizer during vaporization, said overflow preventing chamber being connected to the top of the vaporizer through a connection pipe and having a U-shaped trap extending from its bottom to the interior of the vaporizer;

a heat recovering unit for recovering latent heat of vapor and for preheating low temperature vapor introduced thereto from the vaporizer, said unit being connected to said vaporizer and to an inlet of a coiled vapor heating tube surrounding a vapor heating chamber of an auxiliary boiler and to said panel type steam chambers of the vaporizer and to an outlet of the coiled vapor heating tube through associated conduits, and said unit including:

a plurality of horizontally extending steam conduits, said horizontally extending steam conduits passing the low temperature vapor therethrough; and a plurality of partitions vertically placed in the unit and regularly spaced out;

said auxiliary boiler for receiving the preheated vapor from the heat recovering unit and heating the preheated vapor to a high temperature so as to oxidize or carbonize the vapor, said auxiliary boiler being connected to the heat recovering unit and having a burner, the coiled vapor heating tube and the vapor heating chamber;

a vapor compressing turbine and a vapor compressing pump for compressing the vapor supplied from the vaporizer so as to increase the vapor pressure, both of the turbine and the pump being provided on a conduit extending from the overflow preventing chamber of the vaporizer to the heat recovering unit; and a preheated air supply control valve provided on the conduit in front of said vapor compressing turbine, said valve being adapted for controlling preheated air supplied to vapor flowing from the vaporizer to the heat recovering unit through the conduit.

2. The apparatus according to claim 1, wherein inside end sections of opposed side walls of each of the panel type steam chambers of the vaporizer smoothly converge into a single ridge, thus to let smooth rotation of said agitating blades placed between the panel type steam chambers.

3. A vaporizing and concentration drying method comprising the steps of:

heating water in an auxiliary boiler so as to produce steam, and removing impurities from said steam by carbonizing or oxidizing the steam, and supplying the steam to a plurality of panel type steam chambers of a vaporizer so as to let the steam exchange the heat with wet material in the vaporizer, and draining the steam after heat exchange to a coiled tube of a wet material container through a conduit having both a pressure regulator and a drain valve, thus to recover waste heat from the steam;

increasing or reducing an inner pressure of the vaporizer by handling both a vapor compressing turbine and a vapor compressing pump, thus to introduce the wet material from the container to the vaporizer, and evenly mixing the wet material by opposite directional rotation of a plurality of agitating blades of the vaporizer so as to let the wet material exchange the heat with carbonized vapor of 150° C.–200° C. flowing in the panel type steam chambers and to vaporize the wet material, and discharging vapor of 60° C.–100° C. generated from the wet material from the vaporizer through a connection pipe, while collecting sludge of the wet material to a recess of the vaporizer so as to discharge the sludge outside;

returning overflow liquid included in the vapor of 60° C.–100° C. to the vaporizer through a U-shape trap of an overflow preventing chamber, and selectively supplying preheated air to said vapor of 60° C.–100° C. by handling a preheated air supply control valve, and introducing the vapor of 60° C.–100° C. to a plurality of steam conduits of a heat recovering unit by way of both a vapor compressing turbine and a vapor compressing pump;

letting the vapor of 60° C.–100° C. in the steam conduits of the heat recovering unit exchange the heat with high temperature vapor of 600° C.–800° C., said vapor of 600° C.–800° C. being supplied from said auxiliary boiler and reversely flowing about the steam conduits in a zigzag passage in the unit under the guide of regularly spaced partitions of the unit, and preheating the vapor from 60° C. –100° C. to 450° C.–600° C., and discharging the vapor, reduced in its temperature from 600° C.–800° C. to 150° C.–200° C. as a result of the heat exchange, from the heat recovering unit to the panel type steam chambers of the vaporizer, while introducing the preheated vapor of 450° C.–600° C. to a coiled vapor heating tube and to a vapor heating chamber of said auxiliary boiler;

heating, using a burner, the preheated vapor of 450° C.–600° C. flowing in both the coiled vapor heating tube and the vapor heating chamber of said auxiliary boiler, thus to increase the temperature of vapor from 450° C.–600° C. to 600° C.–800° C. and to oxidize or carbonize odor and impurities of the preheated vapor so as to remove the odor as well as the impurities, and returning the vapor of 600° C.–800° C. to said heat recovering unit so as to cause heat exchange between the high temperature vapor of 600° C.–800° C. and the low temperature vapor of 60° C.–100° C. flowing in the steam conduits of the heat recovering unit; and letting the vapor of 150° C.–200° C. in the panel type steam chambers of the vaporizer exchange the heat with the water, the wet material of the vaporizer, and recovering 539 Kcal of latent heat from the vapor by means of liquidizing at a high temperature, thus to make the vapor become condensed water of about 80° C.–120° C., and introducing the condensed water of about 80° C.–120° C. to said coiled tube of the container by way of said conduit having both the pressure regulator and the drain valve, thus to let the condensed water secondarily exchange the heat with the wet material of the container and to recover waste heat from the condensed water, and collecting the condensed water in a condensed water tank.

\* \* \* \* \*